US012665315B2

(12) United States Patent
Hradecky et al.

(10) Patent No.: US 12,665,315 B2
(45) Date of Patent: Jun. 23, 2026

(54) ANTENNA LENS

(71) Applicant: RFspin s.r.o., Prague (CZ)

(72) Inventors: Zdenek Hradecky, Prague (CZ); Stepan Bosak, Prague (CZ); Tomas Lonsky, Ceske Budejovice (CZ); Pavel Hamouz, Rakovnik (CZ)

( * ) Notice: Subject to any disclaimer, the term of this patent is extended or adjusted under 35 U.S.C. 154(b) by 0 days.

(21) Appl. No.: 18/590,904

(22) Filed: Feb. 28, 2024

(65) Prior Publication Data

US 2025/0316908 A1 Oct. 9, 2025

(51) Int. Cl.
*H01Q 15/08* (2006.01)

(52) U.S. Cl.
CPC .................................. *H01Q 15/08* (2013.01)

(58) Field of Classification Search
CPC ...................................................... H01Q 15/08
See application file for complete search history.

(56) References Cited

U.S. PATENT DOCUMENTS

| | | | | |
|---|---|---|---|---|
| 7,623,085 B1 * | 11/2009 | Lier | H01Q 19/08 343/773 |
| 9,722,316 B2 * | 8/2017 | Haziza | H01Q 15/10 |
| 2019/0067829 A1 * | 2/2019 | Kratzenberg | H01Q 15/08 |
| 2023/0402761 A1 * | 12/2023 | Mueller | H04B 17/30 |

* cited by examiner

*Primary Examiner* — Minh Tran
(74) *Attorney, Agent, or Firm* — Steven Rinehart

(57) ABSTRACT

An antenna lens placed within an outer shell having an outer side comprising a circular surface and opposed side dimensioned to fit into an upper end of an antenna, the lens densificated centrically and having antenna ridges in some embodiments. This antenna lens is useful to provide a cost-effective solution to problems associated with relative permittivity.

3 Claims, 4 Drawing Sheets

ANTENNA LENS

BACKGROUND OF THE INVENTION

Field of the Invention

This invention relates to laboratory measurements and more particularly relates to an antenna lens used in various laboratory measurements.

Description of the Related Art

In the current market there is an antenna lens solution called the Luneburg. This lens has been known for many years and is mainly used in combination with antennas. If the antenna is placed at a focal point on the surface of the lens, the lens can collimate RF signals from the antenna into a plane beam or, conversely, focus a plane wave into the antenna. This makes the antenna system highly directional, increasing its gain and directivity. Its two known basic designs are flat and spherical. The principle of this lens is that the center of the lens has a higher relative permittivity than the outer layers. This gradient causes the electromagnetic waves to bend towards the center of the lens as they pass through the lens and focus to a point on its surface. Changing the relative permittivity is possible either by creating a so-called sandwich structure, where each layer of the lens is made up of a different material with the desired relative permittivity, or by using a special method used in 3D printing that uses a gyroid-type base structure. The gyroid is characterized by an interconnected network of channels and cavities that resembles a labyrinth. It is an infinitely large structure composed of saddle points which lacks any planar or mirror symmetry, making it chiral.

There is a solution on the market that uses the DLP (digital light processing) method of 3D printing using a gyroid structure. During the printing process, the thickness of the printing base cell is varied linearly, thus achieving a thickening of the material and therefore a change in relative permittivity. A special UV (ultraviolet) curable ceramic composite material is used for printing. The disadvantage of these lenses is that they use an open cell structure and are therefore susceptible to the penetration of foreign substances inside the lens. At the same time, the edges of the lens can become broken due to frequent handling. Another disadvantage is the very complex and expensive technology required to produce this lens.

SUMMARY OF THE INVENTION

From the foregoing discussion, it should be apparent that a need exists for an antenna lens. The present invention has been developed in response to the problems and needs in the art that have not yet been fully solved. Accordingly, the present invention has been developed to provide an antenna lens comprising: an ASA material formed using a 3D printing process; a bottom end; a circular surface; an outer side dimensioned to insert into an upper end of an antenna; an opposite side dimensioned to contour a bottom surface of a closed outer shell; wherein the lens defines one or more cutouts on ridges of the antenna; wherein the lens is housed with two closed inner layers; and wherein the lens is housed within a closed outer shell.

The outer shell may be conical in shape. The closed outer shell may comprise a uniform layer of plastic bonded on a circular surface having a lowest densification and lowest permittivity; wherein the closed inner layer comprises a 3D-printed plastic and a gyroid shape with a higher densification and highest permittivity.

The lens may be layered and comprises one of a circular and an elliptical shape.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
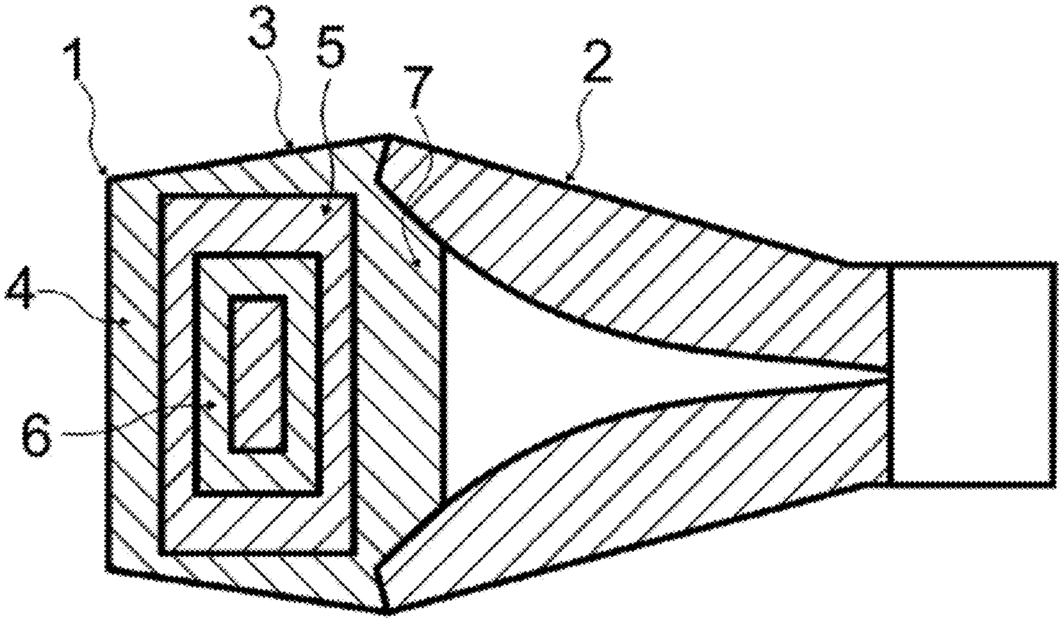
FIG. 1 shows a section of an antenna lens mounted on a single-polarization horn antenna.
Figure 2:
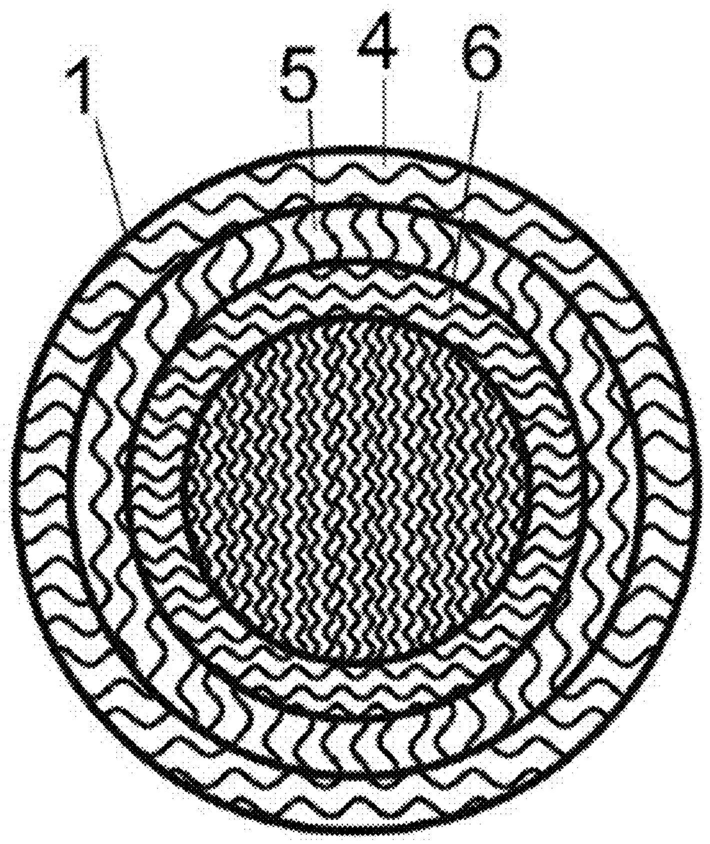
FIG. 2 shows a cross-section through the center of the antenna lense showing the gyroid structure with the center of this lens thickened.
Figure 3A:
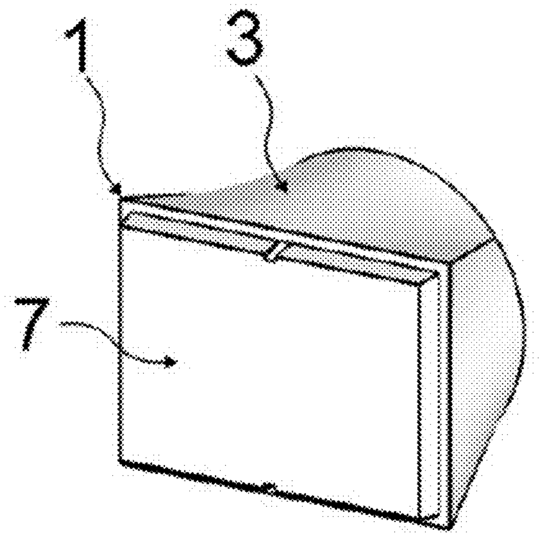
FIG. 3A shows a perspective view of the antenna lens according to the utility model.
Figure 3B:
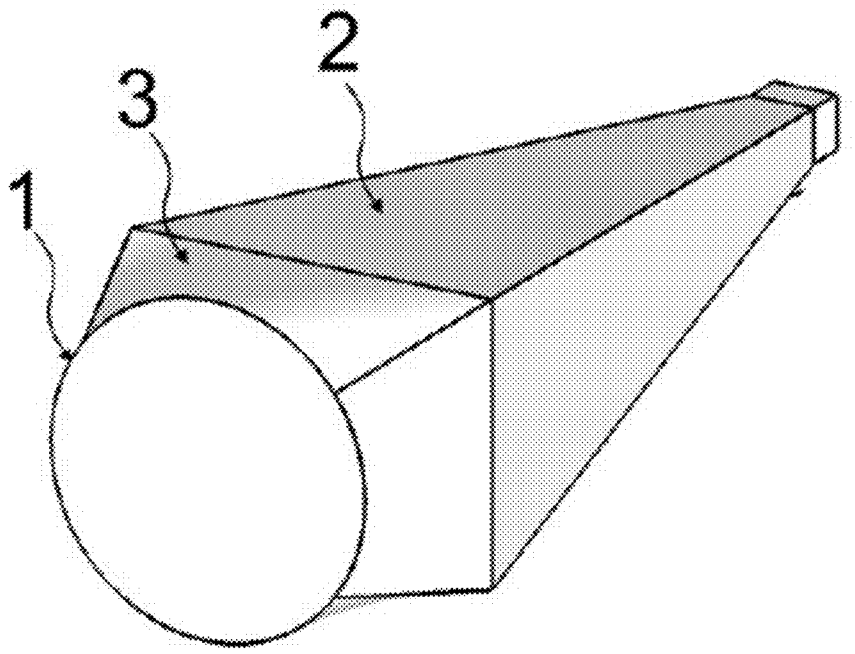
FIG. 3B shows a horn antenna with a mounted antenna lens according to the utility model.

Reference throughout this specification to “one embodiment,” “an embodiment,” or similar language means that a particular feature, structure, or characteristic described in connection with the embodiment is included in at least one embodiment of the present invention. Thus, appearances of the phrases “in one embodiment,” “in an embodiment,” and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The antenna lens according to the utility model has been successfully verified in practice by the originator at the premises of the manufacturer of this new lens.

EXAMPLES OF UTILITY MODEL IMPLEMENTATION

Example 1

The antenna lens 1 according to the utility model is made by 3D printing from ASA material and had a circular shape. The surface 4 of the lens 1 was densified into a uniform outer shell 3, where the surface 4 with the densest densification is directly adjacent to this outer shell 3. In this surface 4 is placed a flat antenna lens 1 according to a utility model based on a Luneburg lens, where the inner layer 6 of this lens 1 has the smallest gyroid cell size and therefore the highest permittivity. The 3D printed lens 1 is terminated by a square cutout 7, which is optimized for the aperture size of the antenna 2, which is 74 mm, and holds the antenna lens 1 embedded in this antenna 2.

Antenna lens 1 was used to improve the electrical parameters of a linearly polarized antenna operating in the 9 GHz to 53 GHz band, in particular the gain and matching of this antenna 2.

Example 2

The antenna lens 1 according to the utility model was made by 3D printing from ASA material according to Example 1 and had an elliptical shape. The antenna lens 1 according to Example 2 was used to compensate the width of the radiated antenna beam in the vertical and horizontal planes and to increase the gain of a linearly polarized antenna operating in the frequency band from 4 GHz to 40 GHz.

Example 3

The antenna lens 1 according to the utility model was made by 3D printing from ASA material according to Example 1 and had five different sizes of gyroid cells. Inside the inner layer 6, another inner layer was added, which was formed by 3D printing with ASA material with maximum cell densification, thereby increasing the permittivity of this inner layer. The cutout 7 of the antenna lens 1 according to Example 3 was shape matched to a dual-polarized antenna 2 with an aperture size of 130 mm operating in the frequency band 740 MHz to 11 GHz. The antenna lens 1 of Example 3 was used to increase the gain of the dual polarized antenna.

Explanations of Abbreviations in the Text

FDM technology is a 3D printing technology that works on the principle of sequential deposition of molten material in thin layers.

The ASA material is acrylonitrile-styrene-acrylic, a high-quality structural thermoplastic with excellent UV resistance and increased weather resistance.

LIST OF RELATIONSHIP TAGS

Lens 1
Antenna 2
Outer shell 3
Surface 4
Inner layer 5
Inner layer 6
Cutout 7

INDUSTRIAL APPLICABILITY AND UTILITY

The new antenna lens is based on a flat Luneburg lens, which is housed in a rigid closed outer shell, which is provided with a circular surface on the outer side and the opposite side directly fits into the upper end of the antenna, which is shaped to match the bottom surface of the closed outer shell, and the lens is made from FDM 3D printed material with the material condensed to the center of the lens. The new lens is further provided with an inner part that is inserted directly between the ridges of the horn-type antenna and serves to increase the gain of the horn-type antenna.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An antenna lens comprising:
an ASA material formed using a 3D printing process;
a bottom end;
a circular surface;
an outer side dimensioned to insert into an upper end of an antenna;
an opposite side dimensioned to contour a bottom surface of a closed outer shell;
wherein the lens defines one or more cutouts on ridges of the antenna;
wherein the closed outer shell comprises a uniform layer of plastic bonded on a circular surface having a lowest densification and lowest permittivity;
wherein the closed inner layer comprises a 3D-printed plastic and a gyroid shape with a higher densification and highest permittivity;
wherein the lens is housed with two closed inner layers; and
wherein the lens is housed within a closed outer shell.

2. The lens of claim 1, wherein the outer shell is conical in shape.

3. The lens of claim 1, wherein the lens is layered and comprises one of a circular and an elliptical shape.

* * * * *